United States Patent
Narasimhan (10) Patent No.: US 9,588,135 B1
(45) Date of Patent: *Mar. 7, 2017

(54) METHOD AND SYSTEM FOR FALL DETECTION OF A USER

(75) Inventor: Ravi Narasimhan, Sunnyvale, CA (US)

(73) Assignee: Vital Connect, Inc., San Jose, CA (US)

( * ) Notice: Subject to any disclaimer, the term of this patent is extended or adjusted under 35 U.S.C. 154(b) by 1394 days.

This patent is subject to a terminal disclaimer.

(21) Appl. No.: 13/420,382

(22) Filed: Mar. 14, 2012

Related U.S. Application Data (63) Continuation-in-part of application No. 13/296,139, filed on Nov. 14, 2011.

(51) Int. Cl.
G08B 23/00 (2006.01)
G08B 21/02 (2006.01)
G01P 15/00 (2006.01)

(52) U.S. Cl.
CPC .............. *G01P 15/00* (2013.01); *G08B 21/02* (2013.01)

(58) Field of Classification Search
CPC ....... A61B 5/1117; A61B 5/725; G01P 15/00; G01P 15/0891; G08B 21/02; G08B 21/043; G08B 21/0446
USPC ..................... 340/669, 539.12, 573.1, 573.7
See application file for complete search history.

(56) References Cited

U.S. PATENT DOCUMENTS

| | | | |
|---|---|---|---|
| 8,092,398 B2 | 1/2012 | Weinberg et al. | |
| 8,408,041 B2 * | 4/2013 | Ten Kate | A61B 5/1117 600/587 |
| 8,460,197 B1 | 6/2013 | Brady et al. | |
| 9,005,141 B1 | 4/2015 | Najafi et al. | |
| 2003/0076792 A1 * | 4/2003 | Theimer | 370/328 |
| 2005/0067816 A1 | 3/2005 | Buckman | |
| 2006/0001545 A1 | 1/2006 | Wolf | |
| 2006/0010340 A1 | 1/2006 | Makela et al. | |
| 2006/0149338 A1 * | 7/2006 | Flaherty et al. | 607/49 |
| 2006/0268447 A1 | 11/2006 | Liao et al. | |
| 2007/0073132 A1 * | 3/2007 | Vosch | 600/393 |
| 2007/0073178 A1 | 3/2007 | Browning et al. | |
| 2008/0146994 A1 * | 6/2008 | Gerber | 604/66 |
| 2008/0174444 A1 | 7/2008 | Noda et al. | |
| 2009/0121863 A1 * | 5/2009 | Prior | 340/539.12 |
| 2009/0187370 A1 | 7/2009 | Pasolini et al. | |
| 2009/0254003 A1 * | 10/2009 | Buckman | 600/595 |
| 2010/0052896 A1 | 3/2010 | Goodman | |

(Continued)

OTHER PUBLICATIONS

A.K. Bourke, et al., "Evaluation of a threshold-based tri-axial accelerometer fall detection algorithm", Gait & Posture 26 (2007), pp. 194-199.

(Continued)

*Primary Examiner* — Brian Wilson
(74) *Attorney, Agent, or Firm* — Brundidge & Stanger, P.C.

(57) ABSTRACT

A method and system for fall detection of a user are disclosed. In a first aspect, the method comprises determining whether first or second magnitude thresholds are satisfied. If the first or second magnitude thresholds are satisfied, the method includes determining whether an acceleration vector of the user is at a predetermined angle to a calibration vector or whether the user is at a stooped posture. If the acceleration vector of the user is at the predetermined angle to the calibration vector or if the user is at the stooped posture, the method includes determining whether an activity metric is satisfied.

15 Claims, 6 Drawing Sheets

(56) References Cited

U.S. PATENT DOCUMENTS

| | | |
|---|---|---|
| 2010/0121226 A1 | 5/2010 | Ten Kate et al. |
| 2010/0121603 A1 | 5/2010 | Nyan et al. |
| 2010/0179389 A1* | 7/2010 | Moroney et al. ............. 600/301 |
| 2010/0228103 A1* | 9/2010 | Schecter ....................... 600/301 |
| 2010/0268304 A1* | 10/2010 | Matos ............................ 607/60 |
| 2010/0316253 A1 | 12/2010 | Yang et al. |
| 2011/0144542 A1 | 6/2011 | Jin et al. |
| 2011/0161111 A1* | 6/2011 | Dicks et al. ....................... 705/3 |
| 2011/0199216 A1 | 8/2011 | Flinsenberg et al. |
| 2012/0092156 A1* | 4/2012 | Tran ......................... 340/539.12 |
| 2013/0031373 A1 | 1/2013 | Shang |
| 2013/0054180 A1 | 2/2013 | Barfield |
| 2016/0100776 A1* | 4/2016 | Najafi ................... A61B 5/1116 600/595 |

OTHER PUBLICATIONS

M. Kangas, et al., "Determination of simple thresholds for accelerometry-based parameters for fall detection", Proceedings of the 29th Annual International Conference of the IEEE EMBS, Aug. 23-26, 2007, pp. 1367-1370.

PCT International Search Report and Written Opinion of the International Searching Authority, issued Mar. 28, 2013, application No. PCT/US2012/064858.

* cited by examiner

METHOD AND SYSTEM FOR FALL DETECTION OF A USER

CROSS-REFERENCE TO RELATED APPLICATIONS

Under 35 U.S.C., this application is a Continuation-in-Part Application and claims priority to U.S. application Ser. No. 13/296,139 filed on Nov. 14, 2011, which is incorporated herein by reference in its entirety.

FIELD OF THE INVENTION

The present invention relates to wireless sensor devices, and more particularly, to using a wireless sensor device to detect a user's fall.

BACKGROUND

Wireless sensor devices are used in a variety of applications including the health monitoring of users. In many of these health monitoring applications, a wireless sensor device is attached directly to the user's skin to measure certain data. This measured data can then be utilized for a variety of health related applications. In one instance, this measured data can be utilized to assist in detecting when a user has fallen due to a health related disease or external factor and is injured as a result.

Conventional approaches have detected when a user has fallen by measuring acceleration data related to the fall and comparing that data to various thresholds. However, these conventional approaches fail to discriminate problematic falls from activities of daily living, such as falling onto a couch to take a nap, and require that the wireless sensor device be attached to the user in specific orientations.

These issues limit the fall detection capabilities of wireless sensor devices. Therefore, there is a strong need for a cost-effective solution that overcomes the above issues by creating a method and system for a more accurate fall detection of a user without having to attach the wireless sensor device to the user in a specific and known orientation. The present invention addresses such a need.

SUMMARY OF THE INVENTION

A method and system for fall detection of a user are disclosed. In a first aspect, the method comprises determining whether first or second magnitude thresholds are satisfied. If the first or second magnitude thresholds are satisfied, the method includes determining whether an acceleration vector of the user is at a predetermined angle to a calibration vector or whether the user is at a stooped posture. If the acceleration vector of the user is at the predetermined angle to the calibration vector or if the user is at the stooped posture, the method includes determining whether an activity metric is satisfied.

In a second aspect, the system comprises a processing system and an application that is executed by the processing system. The application determines whether first or second magnitude thresholds are satisfied. If the first or second magnitude thresholds are satisfied, the application determines whether an acceleration vector of the user is at a predetermined angle to a calibration vector or whether the user is at a stooped posture. If the acceleration vector of the user is at the predetermined angle to the calibration vector or if the user is at the stooped posture, the application determines whether an activity metric is satisfied.

BRIEF DESCRIPTION OF THE DRAWINGS

The accompanying figures illustrate several embodiments of the invention and, together with the description, serve to explain the principles of the invention. One of ordinary skill in the art will recognize that the particular embodiments illustrated in the figures are merely exemplary, and are not intended to limit the scope of the present invention.

DETAILED DESCRIPTION OF PREFERRED EMBODIMENTS

The present invention relates to wireless sensor devices, and more particularly, to using a wireless sensor device to detect a user's fall. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

A method and system in accordance with the present invention allows for fall detection of a user. By implementing a wireless sensor device, an efficient and cost-effective fall detection system is achieved that can discriminate problematic falls from activities of daily living and is accurate regardless of the attachment orientation of the wireless sensor device to the user. One of ordinary skill in the art readily recognizes that a variety of wireless sensor devices may be utilized and that would be within the spirit and scope of the present invention.

To describe the features of the present invention in more detail, refer now to the following description in conjunction with the accompanying Figures.

In one embodiment, a wireless sensor device is attached to a user and continuously and automatically obtains data including but not limited to acceleration samples of the user. An application embedded within a processor of the wireless sensor device compares the acceleration samples to a lower acceleration magnitude threshold or to a higher magnitude threshold and then compares the acceleration samples to a calibration vector to determine whether a user has fallen and potentially been injured.

Figure 1:
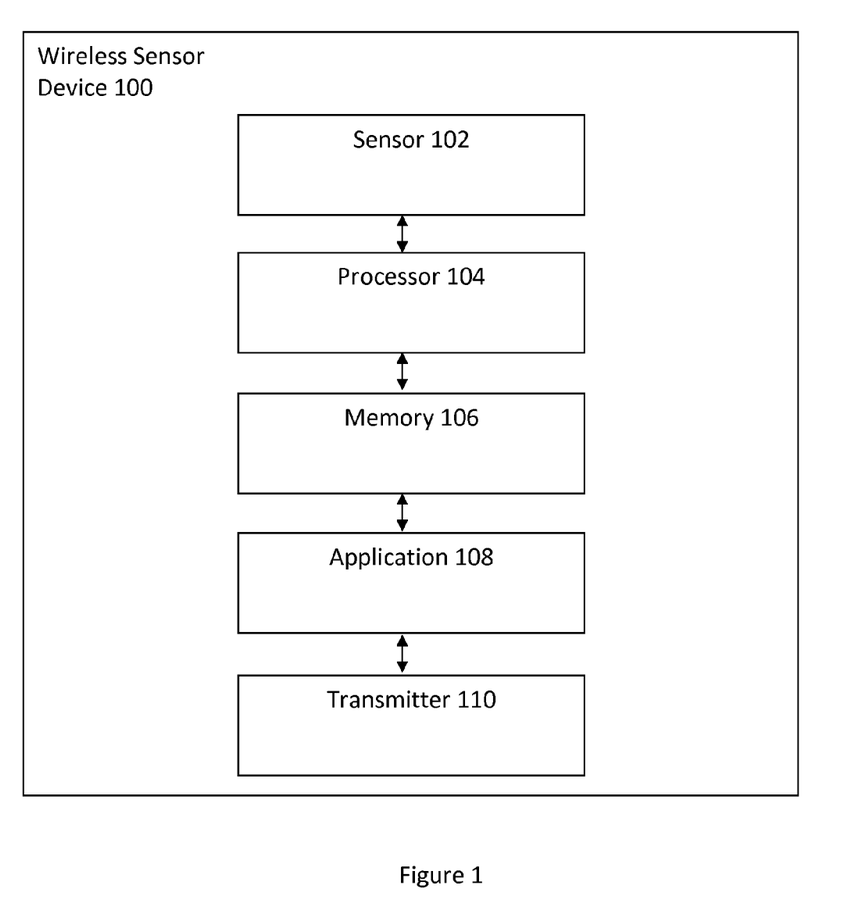
FIG. 1 illustrates a wireless sensor device in accordance with an embodiment.

FIG. 1 illustrates a wireless sensor device 100 in accordance with an embodiment. The wireless sensor device 100 includes a sensor 102, a processor 104 coupled to the sensor 102, a memory 106 coupled to the processor 104, an application 108 coupled to the memory 106, and a transmitter 110 coupled to the application 108. The wireless sensor device 100 is attached, in any orientation, to a user. The sensor 102 obtains data from the user and transmits the data to the memory 106 and in turn to the application 108. The processor 104 executes the application 108 to determine information regarding whether a user has fallen. The information is transmitted to the transmitter 110 and in turn relayed to another user or device.

In one embodiment, the sensor 102 is a microelectromechanical system (MEMS) tri-axial accelerometer and the processor 104 is a microprocessor. One of ordinary skill in the art readily recognizes that the wireless sensor device 100 can utilize a variety of devices for the sensor 102 including but not limited to uni-axial accelerometers, bi-axial accelerometers, gyroscopes, and pressure sensors and that would be within the spirit and scope of the present invention. One of ordinary skill in the art readily recognizes that the wireless sensor device 100 can utilize a variety of devices for the processor 104 including but not limited to controllers and microcontrollers and that would be within the spirit and scope of the present invention. In addition, one of ordinary skill in the art readily recognizes that a variety of devices can be utilized for the memory 106, the application 108, and the transmitter 110 and that would be within the spirit and scope of the present invention.

Figure 2:
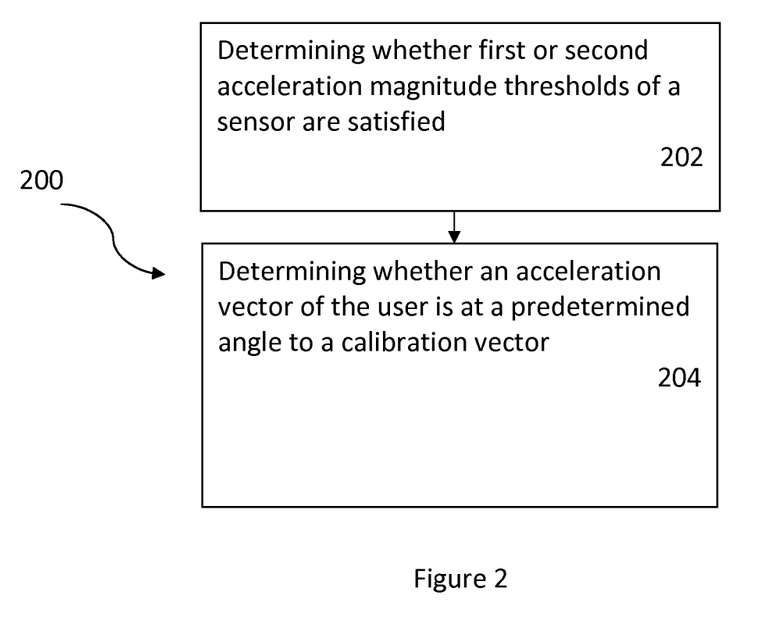
FIG. 2 illustrates a flow chart of a method in accordance with a first embodiment.

FIG. 2 illustrates a flow chart of a method 200 in accordance with a first embodiment. Referring to FIGS. 1 and 2 together, it is determined whether first or second acceleration magnitude thresholds of the sensor 102 are satisfied, via step 202. The sensor 102 is housed within the wireless sensor device 100. If the first or second acceleration magnitude thresholds of the sensor 102 are satisfied, it is determined whether an acceleration vector of a user of the sensor 102 is at a predetermined angle to a calibration vector, via step 204. One of ordinary skill in the art readily recognizes that a variety of predetermined angles can be utilized including but not limited to a nearly orthogonal angle and that would be within the spirit and scope of the present invention.

In one embodiment, if the first or second acceleration magnitude thresholds of the sensor 102 are satisfied and if the acceleration vector of the user of the sensor 102 is at the predetermined angle to the calibration vector, whether the user lacks movement for a predetermined time period is determined and notification information of the fall detection of the user is relayed to another user or device.

In one embodiment, step 202 includes obtaining an acceleration sample from the user and comparing the acceleration sample to a first acceleration magnitude threshold. In this embodiment, if the acceleration sample is less than the first acceleration magnitude threshold, the first acceleration magnitude threshold of the sensor 102 is satisfied. If not, step 202 further includes comparing the acceleration sample to a second acceleration magnitude threshold. If the acceleration sample is greater than the second acceleration magnitude threshold, the second acceleration magnitude threshold of the sensor 102 is satisfied.

In one embodiment, step 204 includes attaching in any orientation, including but not limited to along the X-axis, Y-axis, and Z-axis, the wireless sensor device 100 to the user and determining the calibration vector. The calibration vector is an acceleration vector when the user is in a vertical position, including but not limited to sitting upright or standing. Once the calibration vector is determined, at least one acceleration sample is obtained from the user using the wireless sensor device 100 and the at least one acceleration sample is compared to the calibration vector. If the at least one acceleration sample is nearly orthogonal to the calibration vector, then the fall of the user is detected.

Figure 3:
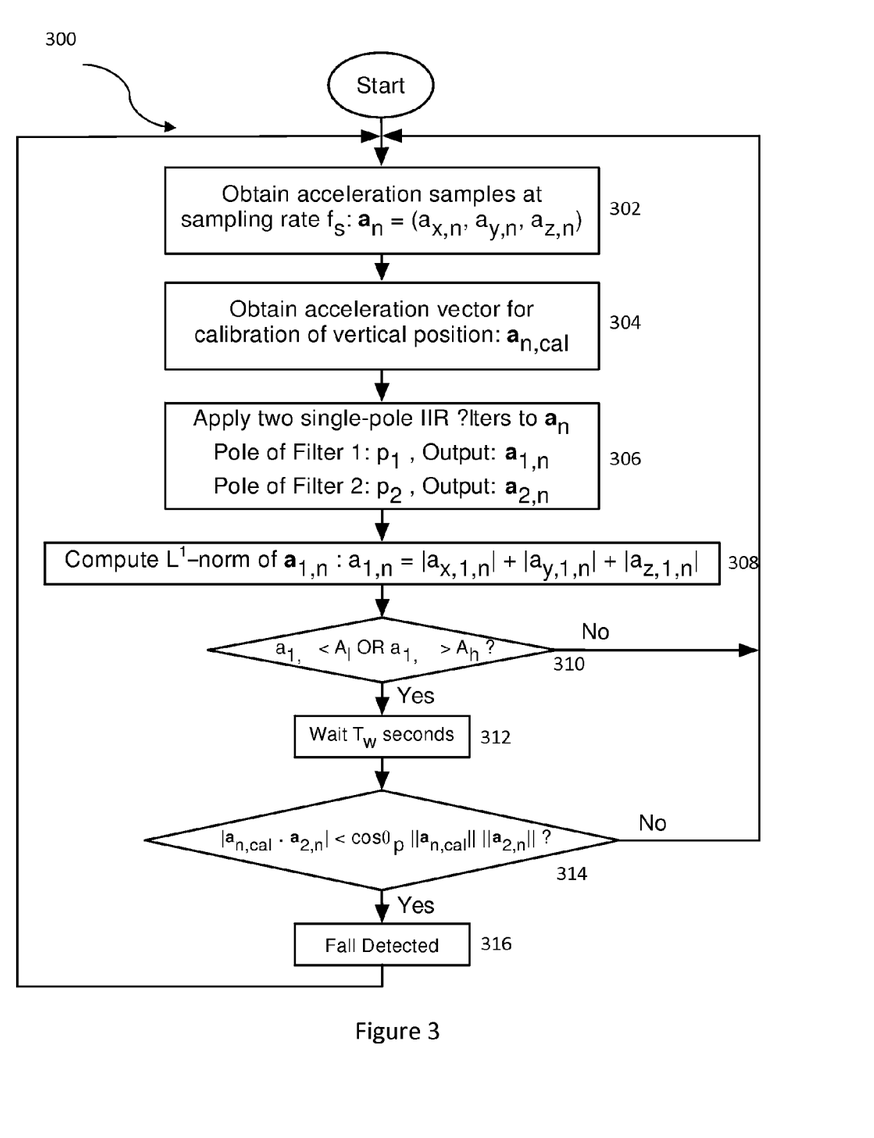
FIG. 3 illustrates a more detailed flow chart of a method in accordance with a first embodiment.

FIG. 3 illustrates a more detailed flowchart of a method 300 in accordance with a first embodiment. In this embodiment, acceleration samples ($a_n$) are obtained from a user of the wireless sensor device 100 at a sampling rate ($f_s$), via step 302. One of ordinary skill in the art readily recognizes that a variety of acceleration sample ranges can be utilized including but not limited to +−4 gravitational acceleration (g) and that would be within the spirit and scope of the present invention. In addition, one of ordinary skill in the art readily recognizes that a variety of sampling rates ($f_s$) can be utilized including but not limited to 60 Hertz (Hz), 100 Hz, and 500 Hz and that would be within the spirit and scope of the present invention. The acceleration samples ($a_n$) can be represented by the following equation:

$$a_n = (a_{x,n}, a_{y,n}, a_{z,n}). \tag{1}$$

After obtaining the acceleration samples ($a_n$), an acceleration vector ($a_{n,cal}$) is obtained for the calibration of the vector position, via step 304. The acceleration vector ($a_{n,cal}$) is a calibration vector. One of ordinary skill in the art readily recognizes that a variety of calibration methodologies for obtaining the calibration vector can be utilized and that would be within the spirit and scope of the present invention. In one embodiment, the wireless sensor device 100 is attached when the user is in a vertical position and then an acceleration sample is measured immediately after the attachment. In this embodiment, the measured acceleration sample is determined to be the calibration vector.

In another embodiment, a pedometer type device is integrated into the wireless sensor device 100 to detect user footsteps. After the wireless sensor device 100 is attached to the user in any horizontal or vertical position, including but not limited to laying down or standing, an acceleration sample is measured immediately after the user takes at least one footstep or is walking. In this embodiment, the measured acceleration sample is determined to be the calibration vector.

Two filters are applied to the acceleration sample ($a_n$) to output vector $a_{1,n}$ from the pole of the first filter (filter 1) and to output vector $a_{2,n}$ from the pole of the second filter (filter 2), via step 306. One of ordinary skill in the art readily recognizes that a variety of filters can be utilized for the two filters including but not limited to single-pole infinite impulse response (IIR) filters, multiple-pole IIR filters, finite impulse response (FIR) filters, median filters, high-pass filters and low-pass filters and that would be within the spirit and scope of the present invention. In one embodiment, the first filter (filter 1) is a single-pole infinite impulse response filter that resembles a high-pass filter with a pole of $p_1 = 1 − 1/8$ and the second filter (filter 2) is a single-pole infinite impulse response filter that resembles a low-pass filter with a pole of $p_2 = 1 − 1/50$.

$L^1$-norm of the output vector $a_{1,n}$ is computed, via step 308, which can be represented by the following equation:

$$a_{1,n} = |a_{x,1,n}| + |a_{y,1,n}| + |a_{z,1,n}|. \tag{2}$$

The $L^1$-norm computation of the output vector $a_{1,n}$ results in a scalar $a_{1,n}$ which is compared to a lower acceleration magnitude threshold ($A_l$) or to a higher acceleration magnitude threshold ($A_h$), via step 310. One of ordinary skill in the art readily recognizes that a variety of $L^P$-norm computations can be utilized including but not limited to $L^1$-norm, $L^2$-norm, and $L^\infty$-norm and that would be within the spirit and scope of the present invention.

In addition, one of ordinary skill in the art readily recognizes that a variety of mathematical calculations can be utilized to convert an output vector into a scalar and that would be within the spirit and scope of the present invention. One of ordinary skill in the art readily recognizes that a variety of acceleration magnitude thresholds can be utilized and that would be within the spirit and scope of the present invention. In one embodiment, the lower acceleration magnitude threshold ($A_l$) is 0.3 g and the higher acceleration magnitude threshold ($A_h$) is 3.5 g.

If the condition in step 310, either $a_{1,n} < A_l$ or $a_{1,n} > A_h$, is satisfied, then a predetermined time period ($T_w$) is waited, via step 312. One of ordinary skill in the art readily recognizes that the predetermined time period may encompass a variety of time periods including but not limited to 2 to 5 seconds and that would be within the spirit and scope of the present invention. If the condition in step 310 is not satisfied, then additional acceleration samples ($a_n$) are obtained, via step 302.

After waiting the predetermined time period ($T_w$), it is determined whether the output vector $a_{2,n}$ is at a predetermined angle ($e_p$), including but not limited to 60 degrees and a nearly orthogonal angle, to the acceleration vector for calibration of vertical position ($a_{n,cal}$), via step 314. This determination can be represented by the following equation:

$$|a_{n,cal} \cdot a_{2,n}| < \cos \theta_p \|a_{n,cal}\| \|a_{2,n}\|. \quad (3)$$

If equation (3) is satisfied, then a user's fall is detected, via step 316 and additional acceleration samples ($a_n$) are obtained, via step 302. If equation (3) is not satisfied, additional acceleration samples ($a_n$) are obtained, via step 302.

Figure 4:
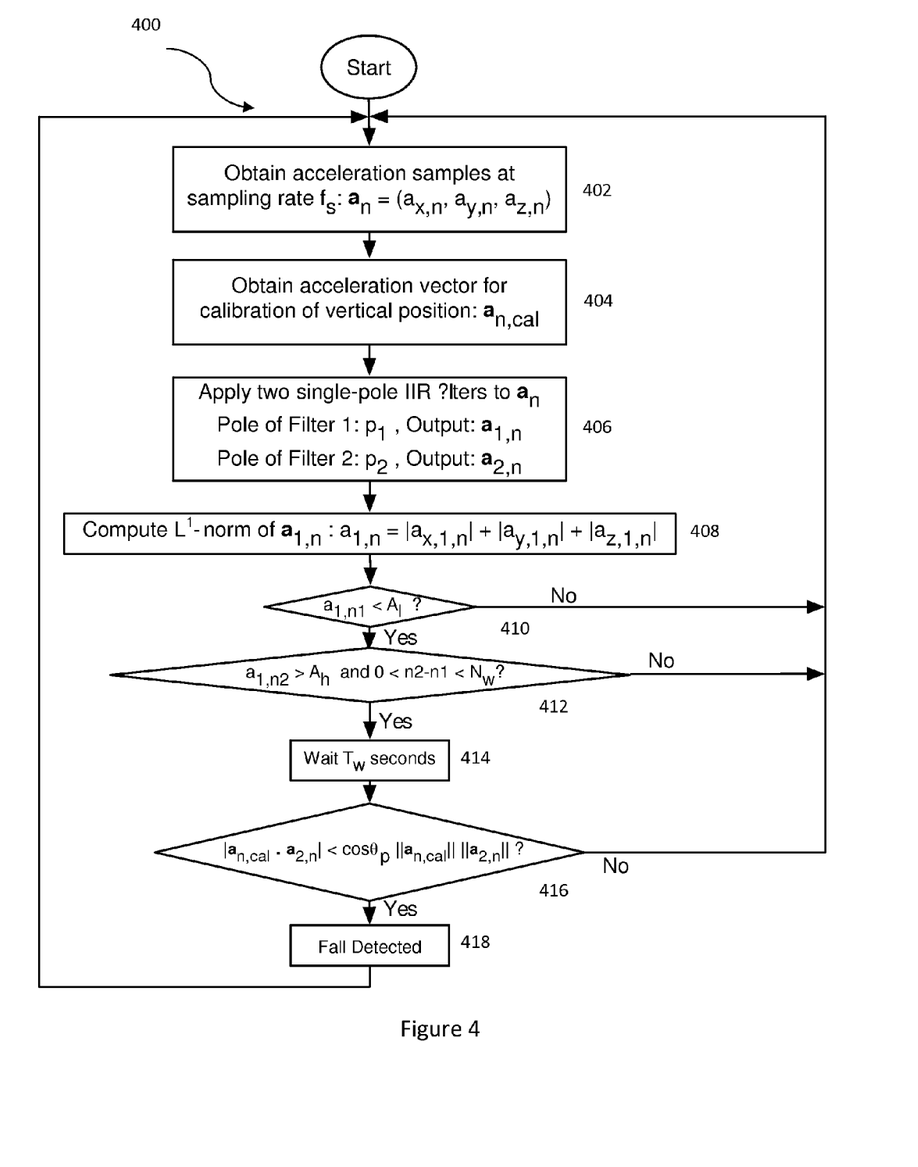
FIG. 4 illustrates a more detailed flow chart of a method in accordance with a second embodiment.

In one embodiment, the $L^1$-norm computation of the output vector $a_{1,n}$ that results in a scalar $a_{1,n}$ is compared to both a lower acceleration magnitude threshold ($A_l$) and also to a higher acceleration magnitude threshold ($A_h$). FIG. 4 illustrates a more detailed flowchart of a method 400 in accordance with a second embodiment. Referring to FIG. 3 and FIG. 4 together, steps 402-408, which are similar to steps 302-308, are performed. After steps 402-408 are performed, scalar $a_{1,n1}$ is compared to a lower acceleration magnitude threshold ($A_l$), via step 410. If the condition in step 410, $a_{1,n1} < A_l$, is not satisfied, then additional acceleration samples ($a_n$) are obtained, via step 302.

If the condition in step 410 is satisfied, scalar $a_{1,n2}$ compared to a higher acceleration magnitude threshold ($A_h$) within a predetermined sampling number ($N_w$), via step 412. One of ordinary skill in the art readily recognizes that the predetermined sampling number ($N_w$) could include a varying number of acceleration samples and that would be within the spirit and scope of the present invention. If the condition in step 412, $a_{1,n} > A_h$ and $0 < n2-n1 < N_w$, is not satisfied, then additional acceleration samples ($a_n$) are obtained, via step 302. Referring to FIG. 3 and FIG. 4 together, if the condition in step 412 is satisfied, steps 414-418, which are similar to steps 312-316, are performed.

After an injurious fall, most individuals are in a horizontal position. Thus, a main feature of the method and system for fall detection of a user is a fall detection algorithm capable of identifying the user's horizontal position after a potential injurious impact. The combination of impact and horizontal position detection provides increased sensitivity and specificity in the fall detection of an individual. Furthermore, because most individuals lie on the floor for a significant amount of time after a potential injurious impact, the fall detection algorithm integrates the requirement of a low activity level of the user several seconds after the potential injurious impact to decrease false positives.

One of ordinary skill in the art readily recognizes that the low activity level can be determined by a variety of methodologies including but not limited to an activity metric that is defined as a moving average of the $L^1$-norm of a band-pass filtered acceleration vector and that would be within the spirit and scope of the present invention. Additionally, one of ordinary skill in the art readily recognizes that a horizontal position of the user can be determined by a variety of methodologies including but not limited to computing an angle of an acceleration vector shortly after an impact with an acceleration vector obtained when the user was in a vertical position.

In order to compute the angle of the acceleration vector shortly after the impact and provide flexibility in the wireless sensor device placement and orientation on the torso of the user, a calibration procedure is utilized to determine the vertical acceleration vector before the fall detection algorithm is executed. One of ordinary skill in the art readily recognizes that several calibration methods can be utilized including but not limited to implicit calibration by measuring the acceleration vector when the user is walking, explicit calibration involving the user notifying a system (e.g., using a mobile phone) when he or she is in a vertical position and that would be within the spirit and scope of the present invention.

If the user has a stooped posture, the fall detection algorithm disregards the user's horizontal position and utilizes impact alone for the fall detection. One of ordinary skill in the art readily recognizes that a stooped posture can include a variety of postures including but not limited to a posture inferred if the magnitude of a z-axis component of the acceleration vector measured during calibration is greater than a threshold and that would be within the spirit and scope of the present invention.

Figure 5:
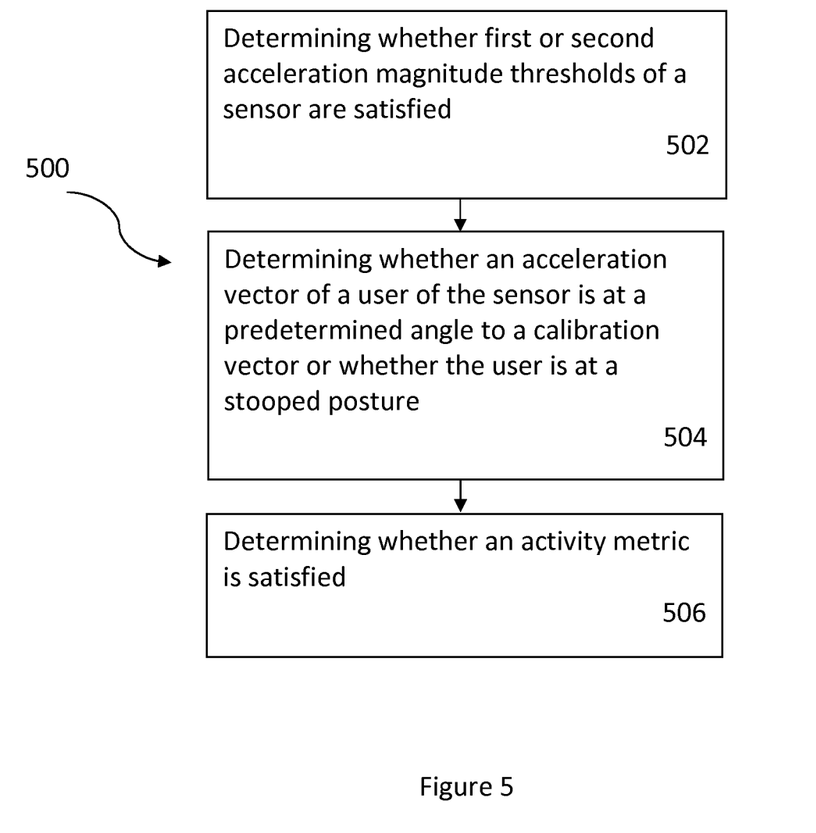
FIG. 5 illustrates a flow chart of a method in accordance with a second embodiment.

FIG. 5 illustrates a flow chart of a method 500 in accordance with a second embodiment. Referring to FIGS. 1 and 2 together, it is determined whether first or second acceleration magnitude thresholds of the sensor 102 are satisfied, via step 502. The sensor 102 is housed within the wireless sensor device 100. If the first or second acceleration magnitude thresholds of the sensor 102 are satisfied, it is determined whether an acceleration vector of a user of the sensor 102 is at a predetermined angle to a calibration vector or whether a user of the sensor 102 is at a stooped posture, via step 504. If the acceleration vector of the user is at the predetermined angle to the calibration vector or if the user is at the stooped posture, it is determined whether an activity metric is satisfied, via step 506.

One of ordinary skill in the art readily recognizes that a variety of predetermined angles can be utilized including but not limited to a nearly orthogonal angle and that would be within the spirit and scope of the present invention. Additionally, one of ordinary skill in the art readily recognizes that a variety of methodologies for determining whether the user is at the stooped posture can be utilized and that would be within the spirit and scope of the present invention.

Figure 6:
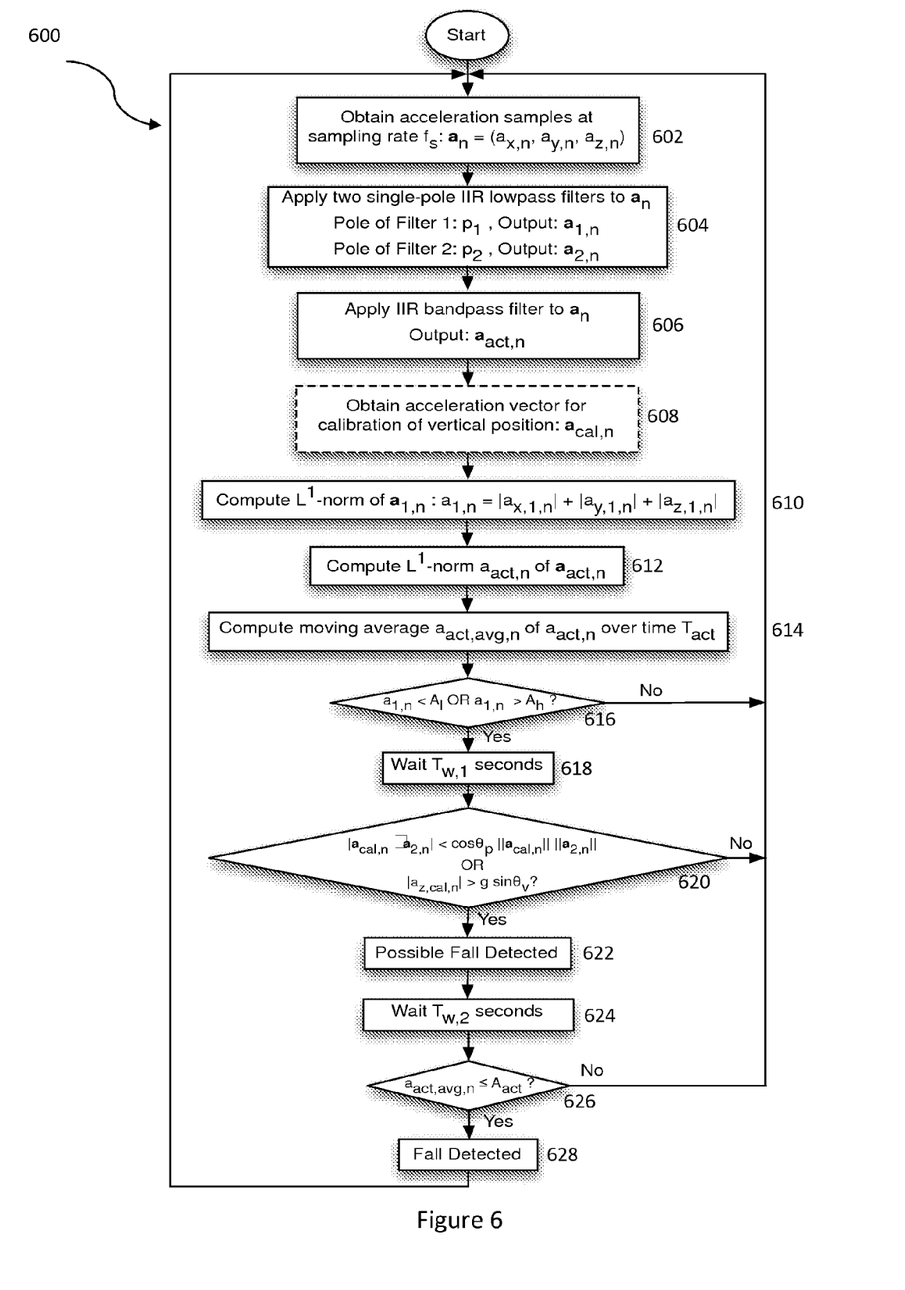
FIG. 6 illustrates a more detailed flow chart of a method in accordance with a third embodiment.

FIG. 6 illustrates a more detailed flowchart of a method 600 in accordance with a third embodiment. In the method 600, the flowchart is of a fall detection algorithm located within the wireless sensor device 100. Referring to FIG. 4 and FIG. 6 together, steps, 602, 604, 608, and 610, which are similar to steps 402, 406, 404, and 408 respectively, are performed. In one embodiment, an acceleration vector $a_n = (a_{x,n}, a_{y,n}, a_{z,n})$ consisting of the x, y, and z components is obtained from a user of the wireless sensor device 100 at the $n^{th}$ time instant with a sampling rate ($f_s$) of 125 Hz using the tri-axial accelerator located within the wireless sensor device 100, via step 602.

In this embodiment, the acceleration vector $a_n$ is passed through two single-pole IIR low-pass filters with poles $p_1$=13.8 Hz and $p_2$=0.8 Hz to produce vectors $a_{1,n}$ and $a_{2,n}$, via step 604. Vector $a_{1,n}$ is used to track large changes in acceleration from impacts and vector $a_{2,n}$, which contains only very low frequencies, is used to obtain stable measurements for horizontal position determination. One of ordinary skill in the art readily recognizes that the poles of the IIR low-pass filters can be a variety of values and that would be within the spirit and scope of the present invention.

In between steps 604 and 608, an IIR band-pass filter is further applied to $a_n$ to produce a vector $a_{act,n}$, which is a measure of an activity level of the user, via step 606. One of ordinary skill in the art readily recognizes that a variety of IIR band-pass filters can be utilized including but not limited to a sixth-order elliptic filter with a passband ripple of 0.1 decibel (dB), a stopband attenuation of 100 dB, and a passband of 0.25 Hz to 20 Hz and that would be within the spirit and scope of the present invention.

During the initialization of the fall detection algorithm, a calibration vector $a_{cal,n}$ is obtained using the vector $a_{2,n}$, via step 608. In continuous operation, the $L^1$-norm of vector $a_{1,n}$ is computed, via step 610, as follows:

$$a_{1,n} = \|a_{1,n}\|_1 = |a_{x,1,n}| + |a_{y,1,n}| + |a_{z,1,n}| \quad (4).$$

For the activity level of the user, the $L^1$-norm $a_{act,n}$ of $a_{act,n}$ is computed, via step 612. The computed $L^1$-norm $a_{act,n}$ is utilized to further compute a moving average of $a_{act,n}$ over a time period ($T_{act}$), or $a_{act,avg,n}$, where $a_{act,avg,n}$ is also defined as the activity metric, via step 614. An impact is detected if the $L^1$-norm $a_{1,n}$ is less than a first threshold $A_l$ or greater than a second threshold $A_h$, via step 616. More specifically, the first threshold condition ($a_{1,n} < A_l$) detects the occurrence of a near "free fall" motion of the user before impact while the second threshold condition ($a_{1,n} > A_h$) detects the large acceleration caused by the impact of the user falling to the ground.

In this embodiment, if an impact is detected, the fall detection algorithm waits for a time period ($T_{w,1}$ seconds), via step 618. After waiting $T_{w,1}$ seconds, the horizontal position criterion is determined. The user is determined to be in a horizontal position if the angle between the calibration vector $a_{cal,n}$ and vector $a_{2,n}$ is larger than $\theta_p$, via step 620, where the $L^2$-norm of $a_n$ is given by $\|a_n\|_2 = (a_{x,n}^2 + a_{y,n}^2 + a_{z,n}^2)^{1/2}$, per the following equation:

$$|a_{cal,n} \cdot a_{2,n}| < \cos \theta_p \|a_{cal,n}\|_2 \|a_{2,n}\|_2 \quad (5).$$

As aforementioned, the horizontal position criterion is ignored if a stooped posture of the user is detected during calibration, also via step 620, per the following equation:

$$|a_{z,cal,n}| > g \sin \theta_v \quad (6).$$

Accordingly, a possible fall of the user is detected via step 622 if both the impact criteria (via step 616) are satisfied and either the horizontal position criterion is satisfied or a stooped posture is detected during calibration (via step 620). If a possible fall is detected, the fall detection algorithm waits for a second time period ($T_{w,2}$ seconds), via step 624. After waiting $T_{w,2}$ seconds, the activity criterion comparing $a_{act,avg,n}$ to a predetermined $A_{act}$ value is checked, via step 626.

If the activity criterion is not satisfied, or $a_{act,avg,n} > A_{act}$, the user was active and likely unharmed after the possible fall; thus, the possible fall is not upgraded to an actual determined fall. However, if the activity criterion is satisfied, or $a_{act,avg,n} \leq A_{act}$, the user was not active and likely harmed after the possible fall; thus, the possible fall is upgraded to an actual determined fall, via step 628.

After an actual determined fall is detected by the fall detection algorithm of method 600, one of ordinary skill in the art readily recognizes that a variety of notification measures can be taken to ensure the safety of the user including but not limited to notifying a monitoring system, another user, the police, and the medical authorities and that would be within the spirit and scope of the present invention.

One of ordinary skill in the art readily recognizes that typical parameter values for the fall detection algorithm of method 600 can be a variety of values including but not limited to $A_l$=0.3 g, $A_h$=3.0 g, $A_{act}$=0.2 g, $\theta_p$=60°, $\theta_v$=20°, $T_{w,1}$=2 s, $T_{w,1}$=60 s, and $T_{act}$=1 s and that would be within the spirit and scope of the present invention.

As above described, the method and system allow for fall detection of a user that discriminates problematic and injurious falls from activities of daily living, including but not limited to falling onto a couch to take a nap. Additionally, the fall detection can be done without regard to the attachment orientation of the wireless sensor device to the user. By implementing a tri-axial accelerometer within a wireless sensor device to detect acceleration samples and an application located on the wireless sensor device to process the detected acceleration samples, an efficient and cost-effective fall detection system is achieved that can support various types of falls and can confirm that the user is in a horizontal position.

A method and system for fall detection of a user have been disclosed. Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk—read/write (CD-RAN).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for fall detection of a user, the method comprising:
   determining whether first or second magnitude thresholds are satisfied;
   if the first or second magnitude thresholds are satisfied, determining whether an acceleration vector of the user is at a predetermined angle to a calibration vector or whether the user is at a stooped posture; and
   if the acceleration vector of the user is at the predetermined angle to the calibration vector or if the user is at the stooped posture, determining whether an activity metric is satisfied, wherein if a moving average of the user is greater than a predetermined activity level, the activity metric is not satisfied and notification information of the fall detection is disregarded, wherein if the moving average of the user is lesser than the predetermined activity level, the activity metric is satisfied and the notification information of the fall detection is confirmed,
   wherein determining whether first or second magnitude thresholds are satisfied further comprises:
   obtaining an acceleration sample from the user;
   comparing the acceleration sample to a first acceleration threshold;
   wherein if the acceleration sample is less than the first acceleration threshold, the first magnitude threshold is satisfied, else comparing the acceleration sample to a second acceleration threshold;
   wherein if the acceleration sample is greater than the second acceleration threshold, the second magnitude threshold is satisfied, and
   wherein comparing the acceleration sample to the first acceleration threshold further comprises:
   applying two filters to the acceleration sample to output an acceleration vector;
   calculating $L^P$-norm of the acceleration vector to output an acceleration scalar; and
   comparing the acceleration scalar to the first acceleration threshold.

2. The method of claim 1, wherein comparing the acceleration sample to the second acceleration threshold further comprises:
   comparing the acceleration scalar to the second acceleration threshold.

3. The method of claim 1, wherein $L^P$-norm is any of $L^1$-norm, $L^2$-norm, $L^\infty$-norm and the two filters are any of single-pole infinite impulse response (IIR) filters, multiple-pole IIR filters, finite impulse response (FIR) filters and median filters.

4. The method of claim 1, wherein the two filters are any of single-pole infinite impulse response (IIR) filters, multiple-pole IIR filters, finite impulse response (FIR) filters and median filters.

5. The method of claim 1, wherein determining whether an acceleration vector of the user is at a predetermined angle to a calibration vector further comprises:
   attaching a wireless sensor device to the user;
   determining the calibration vector, wherein the calibration vector is an acceleration vector when the user is vertical;
   obtaining at least one acceleration sample from the wireless sensor device;
   comparing the at least one acceleration sample to the calibration vector; and
   wherein if the at least one acceleration sample is nearly orthogonal to the calibration vector, detecting the fall of the user.

6. The method of claim 5, wherein determining the calibration vector further comprises:
   attaching the wireless sensor device when the user is vertical; and
   measuring an acceleration sample after attachment, wherein the acceleration sample is determined to be the calibration vector.

7. The method of claim 5, wherein determining the calibration vector further comprises:
   measuring an acceleration sample after the user is walking, wherein the acceleration sample is determined to be the calibration vector.

8. The method of claim 5, wherein the wireless sensor device is attached, in any orientation, to the user.

9. The method of claim 1, further comprising:
   wherein if the first or second magnitude thresholds are satisfied, waiting a predetermined time period before determining whether the acceleration vector of the user is at the predetermined angle to the calibration vector or whether the user is at the stooped posture.

10. The method of claim 1, further comprising:
    relaying the notification information of the fall detection of the user to another user or device.

11. The method of claim 1, wherein determining whether an activity metric is satisfied further comprises:
    applying an IIR band-pass filter to the acceleration vector of the user to produce an activity level vector of an activity level of the user;
    calculating $L^1$-norm of the activity level vector to output an activity level scalar;
    calculating the moving average of the activity level scalar over a time period; and
    comparing the moving average to the predetermined activity level.

12. The method of claim 1, wherein determining whether the user is at a stooped posture further comprises:
    calculating a z-axis component of the calibration vector; and
    comparing the z-axis component of the calibration vector to a predetermined level.

13. A wireless sensor device for fall detection of a user, the wireless sensor device comprising:
    a processing system; and
    an application to be executed by the processing system, wherein the application:
    determines whether first or second magnitude thresholds are satisfied,
    if the first or second magnitude thresholds are satisfied, determines whether an acceleration vector of the user is at a predetermined angle to a calibration vector or whether the user is at a stooped posture, and
    if the acceleration vector of the user is at the predetermined angle to the calibration vector or if the user is at the stooped posture, determines whether an activity metric is satisfied, wherein if a moving average of an activity level of the user is greater than a predetermined activity level, the activity metric is not satisfied and notification information of the fall detection is disregarded, wherein if the moving average of the activity level of the user is lesser than the predetermined activity level, the activity metric is satisfied and the notification information of the fall detection is confirmed, wherein the application further:

obtains an acceleration sample from the user;

compares the acceleration sample to a first acceleration threshold;

wherein if the acceleration sample is less than the first acceleration threshold, the first magnitude threshold is satisfied, else the application compares the acceleration sample to a second acceleration threshold;

wherein if the acceleration sample is greater than the second acceleration threshold, the second magnitude threshold is satisfied, wherein the application further:

applies two filters to the acceleration sample to output an acceleration vector; calculates $L^p$-norm of the acceleration vector to output an acceleration scalar; and compares the acceleration scalar to the first acceleration threshold or to the second acceleration threshold.

14. The wireless sensor device of claim 13, wherein the application determines whether an activity metric is satisfied further comprises that the application:

applies an IIR band-pass filter to the acceleration vector of the user to produce an activity level vector of the user;

calculates $L^1$-norm of the activity level vector to output an activity level scalar;

calculates the moving average of the activity level scalar over a time period; and compares the moving average to the predetermined activity level.

15. The wireless sensor device of claim 13, wherein if the first or second magnitude thresholds are satisfied, if the acceleration vector of the user is at the predetermined angle to the calibration vector or the user is at the stooped posture, and if the activity metric is satisfied, the application further:

relays the notification information of the fall detection of the user to another user or device.

* * * * *